United States Patent [19]

Iijima

[11] 4,178,083
[45] Dec. 11, 1979

[54] CAMERA CONTAINING A MOVABLE AUTOMATIC DIMMER STROBO

[75] Inventor: Yaichi Iijima, Hachioji, Japan

[73] Assignee: Konishiroku Photo Industry Co., Ltd., Tokyo, Japan

[21] Appl. No.: 956,974

[22] Filed: Nov. 2, 1978

[30] Foreign Application Priority Data

Dec. 26, 1975 [JP] Japan .................. 50-176660[U]

[51] Int. Cl.² .................. G03B 7/00; G03B 15/03
[52] U.S. Cl. .................. 354/41; 354/42; 354/59; 354/149
[58] Field of Search .......... 354/35, 41, 42, 47, 354/58, 59, 139, 149, 32, 33, 34

[56] References Cited

U.S. PATENT DOCUMENTS

| | | | |
|---|---|---|---|
| Re. 26,763 | 1/1970 | Hennig et al. | 354/149 |
| 3,273,479 | 9/1966 | Jakob | 354/149 |
| 3,273,483 | 9/1966 | Weidner et al. | 354/149 X |
| 3,457,844 | 7/1969 | Kitai | 354/41 X |
| 3,598,031 | 8/1971 | Harvey | 354/149 |

Primary Examiner—Michael L. Gellner
Attorney, Agent, or Firm—James E. Nilles

[57] ABSTRACT

A camera containing a movable automatic dimmer strobo, which camera, during ordinary photographing operation, sets the iris diameter by way of an automatic exposure control device and, during the flash photographing operation, effects the photographing with a particular iris diameter. Said camera has an automatic dimmer strobo which is so contained as to undergo displacement with respect to the camera body, a film-sensitivity changing ring, and an iris ring that can engage with said film-sensitivity changing ring. Said camera is characterized in that the displacement action of said automatic dimmer strobo is interlocked to the operation which changes the state in which the iris diameter is set by displacing the iris ring to a position corresponding to a turning angle which is set for the ring for changing the film sensitivity, and the iris information is transmitted to the iris device by way of the iris diameter set portion that is provided on said iris ring.

11 Claims, 2 Drawing Figures

4,178,083

CAMERA CONTAINING A MOVABLE AUTOMATIC DIMMER STROBO

FIELD OF INVENTION

The present invention is related to a camera containing an automatic dimmer strobo.

SUMMARY OF THE INVENTION

With the automatic dimmer strobo, the emission of light is stopped when the quantity of light reflected from the object to be photographed reaches a certain value. Therefore, the light is emitted in appropriate quantity liberating the photographer from a troublesome operation of the exposure control system. However, it is necessary to set the iris diameter at a particular value and to introduce the film sensitivity information to the iris through some mechanism. Accordingly, when such automatic dimmer strobo is installed in a camera having an automatic exposure device (hereinafter called an EE device), two sets of film sensitivity information introducing means of different system must be provided in said camera.

Namely, in the EE device, the iris diameter is controlled depending upon the quantity of light that is incident on a light-receiving part of the EE device, so that it is required to introduce photoelectrically the film sensitivity information to the EE device and to correct the output of the EE device. In the automatic dimmer strobo, the iris diameter is set at a particular value, so that it is required to provide an exclusive iris correcting system for correcting the iris diameter depending upon the film sensitivity.

The device of the present invention is characterized in that an operation for introducing the film sensitivity information to the EE device in the ordinary photographing mode and an operation for introducing the film sensitivity information to the iris in the flash photographing mode can be carried out by using a common adjustable film sensitivity changing ring.

Other objects and features of the present invention will become apparent from the following description illustrated with reference to the accompanying drawing.

DESCRIPTION OF A PREFERRED EMBODIMENT

Figure 1:
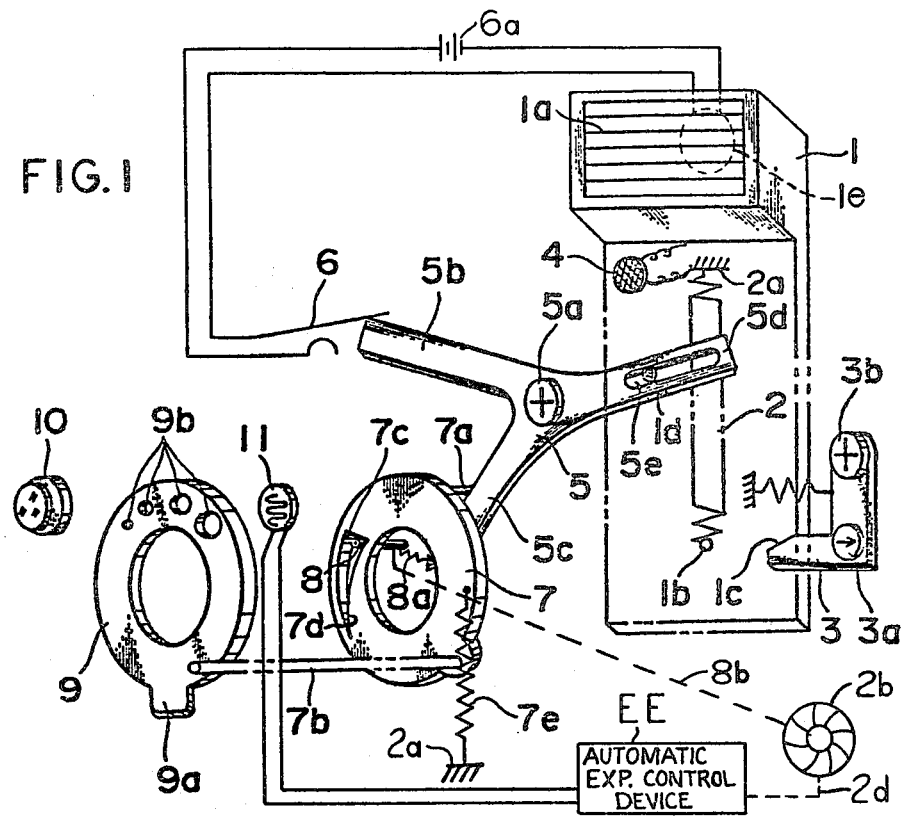
FIG. 1 is a diagram to show the internal mechanism of the camera of the present invention under ordinary photographing operation.
Figure 2:
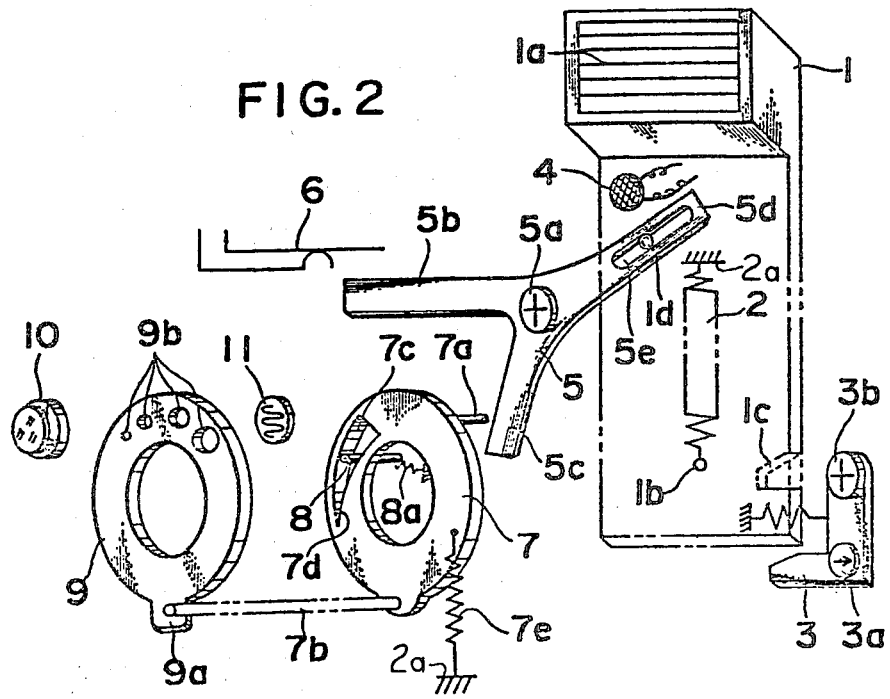
FIG. 2 is a diagram to show the internal mechanism of the camera of the present invention under the operation of flash photographing.

Referring to the drawing, a camera in accordance with the invention comprises a body or housing portion 2a, an adjustable iris 2b and automatic exposure control means including an automatic exposure control device EE connected by suitable means 2a to change the diameter of adjustable iris 2b in response to the amount of light passing through a light collecting window 10 through an aperture 9b in an adjustable film sensitivity changing ring 9 to a photoresponsive light-receiving part 11 which is electrically connected to the automatic exposure control device EE by a suitable mechanical linkage 8b. The reference numeral 1 designates an automatic dimmer strobo having a light-emitting part 1a and including a light source 1e, which is contained in the camera housing. The reference symbol 1b represents a pin studded on the strobo 1, and works to hold one end of a spring 2 that is loaded in the camera. The reference symbol 1c stands for a notch formed on the strobo, and is so constructed as to engage with a strobo holder lever 3 which has a lever operation part 3a exposed beyond the camera body 2a and which can turn about a shaft 3b. The reference symbol 1d is a pin studded on the strobo body and is inserted in a guide groove 5e which is formed in an operation arm 5d of a switching member 5 having a strobo switching arm 5b and a ring arm 5c of actuating the iris ring. The pin 1d is allowed to undergo displacement depending upon the displacement of the strobo in the up and down directions. The switching member 5 is so provided as to turn about the shaft 5a. The reference numeral 6 denotes a switch for the strobo power supply 6a, and is turned on or off depending upon the turn of the strobo switching arm 5b. The reference numeral 7 is an iris ring which is always urged in the clockwise direction by way of a spring 7e, and has a pin 7a that engages with said ring arm 5c and a pin 7b that engages with a switching projection 9a on a ring 9 for changing the sensitivity of the film. The reference numeral 4 denotes a strobo reflection light-receiving portion which is a portion of a strobo flashing time control circuit (not shown) which is publicly known and is provided in the strobo 1. The iris ring 7 has a hole 7c into which an iris pin 8 is inserted and a cam surface 7d that determines the iris diameter in the strobo photographing mode. Said iris pin 8 is provided for introducing the iris diameter information to the iris device 2b and always so urged by a spring 8b as to come into contact with said cam surface 7d. Said iris pin 8, however, can be moved in the radial direction of said iris ring 7 in said hole 7c depending upon the iris control output of said EE device against the spring action of said spring 8a. Namely, when the iris control output of said EE device is small, i.e., the field of vision is dark, said iris pin 8 is positioned near the photographing axis, i.e., on the cam surface 7d by the spring action of said spring 8a.

In addition to the aforesaid switching projection 9a, the ring 9 for changing the film sensitivity possesses windows 9b for the purpose of transmitting the film sensitivity information to the EE device. Said windows 9b comprise a plurality of windows each having a diameter corresponding to each light bundle, which corresponds to each film sensitivity. The reference numeral 10 designates a light-collecting window, and the reference numeral 11 is a light-receiving part connected to the EE device.

The operation of the device of the present invention is illustrated below.

Under the ordinary photographing operation, the strobo body 1 is kept contained in the camera body as shown in FIG. 1, in which the switching member 5 is pushed down by the pin 1d of the strobo body 1. Therefore, the strobo switching arm 5b keeps the switch 6 of the strobo power supply turned off. The iris ring switching arm 5c, also, keeps the iris ring 7 in a state in which the pin 7b is disengaged from the projection 9a of the ring 9 for changing the film sensitivity. In this state, the automatic dimmer strobo is not electrically charged, so that the operation of photographing may be the ordinary photographing mode using the EE device. Therefore, the film sensitivity information is introduced optically in the light-receiving part 11 of the EE device through the selected window 9b for changing the iris diameter.

During the operation of flash photographing, on the other hand, the strobo holder lever 3 is disengaged from the notch 1c of the strobo body 1, whereby the strobo body 1 undergoes displacement owing to the force of the spring 2 to a position at which the "red-eye phenomenon" can be prevented with respect to the camera body. At this moment, the pin 1d on the strobo body pushed up the operation arm 5d, causing the switching member 5 to turn in the counterclockwise direction. The strobo switching arm 5b, therefore, is separated from the switch 6 of strobo power supply, turning on the strobo power supply which had been turned off. Also, the iris ring arm 5c retracts from the state in which the pin 7a had been pushed; the iris ring 7, therefore, is turned by the force of the spring 7e in the clockwise direction until it is stopped after the pin 7b of the ring 7 hits the projection 9a during switching of the iris ring 7. Generally, the flash photographing mode the field of vision is so dark that the ordinary photographing is not suitable to carry out. Namely, in this state, the iris control output of the EE device is small, so that the iris pin 8 is positioned near the photographing axis and in contact with the cam surface 7d. Accordingly, as the iris ring 7 turns, the iris pin 8 undergoes displacement along the cam surface 7d. As a consequence, the iris device detects the position of the iris pin 8 on the cam surface to thereby set a particular iris diameter suited for flash photographing. If the curve of the cam surface 7d is so designed that the amount of film sensitivity change in the strobo photographing mode is equal to the amount of operation in the ordinary photographing mode (corresponding to the angular distance between the windows 9b), the film sensitivity information can be changed by only the rotation of the ring 9 for changing the film sensitivity in both photographing modes.

In a camera according to the present invention, two photographing modes, such as the ordinary photographing mode using day light and the flash photographing mode using strobo light, can be used in photographing. Normally, in case of the ordinary photographing mode, the automatic exposure adjusting mode is used and in the case of the flash photographing mode, the diaphragm opening is set to a special value determined only by the film sensitivity information. This advantage in the flash photographing mode can be obtained by using the automatic dimmer strobo 1. In the present invention, it is not necessary to change or adjust the opening of the diaphragm or iris 2b according to a change of photographing distance, which is otherwise necessary in photographing using the normal strobo. In the flash photographing mode of the present invention, the optimum exposure is obtained by not adjusting the diaphragm opening of iris 2b, but by adjusting the quantity of the radiation of the strobo 1 according to the change of photographing distance. In other words, in the flash photographing mode of the present invention, normal adjusting of the diaphragm 2b is not carried out, but it is sufficient that the diaphragm opening is set to a special value determined by the film sensitivity information. Accordingly, the iris ring 7 is a member for determining the diaphragm opening according to the film sensitivity information and is different in function and effect from the normal diaphragm adjusting member.

As stated above, in the flash photographing mode of the present invention, the diaphragm opening of iris 2b is set to a value corresponding to only the film sensitivity information, so that it is not necessary basically to set the automatic exposure adjusting mode in inoperative state even in the case of the flash photographing mode. Usually, when the flash photographing mode is used it is considered that the scene is so dark that the ordinary photographing mode cannot be used. In this state, the output of the automatic exposure diaphragm adjusting device depending upon the luminance of the scene, namely, the diaphragm adjusting output is very small, so that the iris pin 8 is positioned nearer to the photographing light axis under the spring action of the spring 8a. The iris pin 8 can be moved in the radial direction of the iris ring 7 and is contacted with the cam surface 7d of the iris ring 7 by the spring action of the spring 8a. Accordingly, when the iris ring 7 is rotated according to the rotating operation of the film sensitivity changing ring 9, the iris pin 8 is moved in the radial direction of the iris ring 7 along the cam surface 7d, so that the diaphragm opening of iris 2b is set to a value according to the predetermined film sensitivity information.

This state is substantially the same as the state in which the automatic exposure adjusting mode is set in for the inoperative state. For example, when the automatic exposure adjusting mode is set in the inoperative state, the diaphragm adjusting output becomes zero, so that the iris pin 8 is positioned near to the photographing light axis due to the action of the spring 8a and contacted with the cam surface 7d of the iris ring 7. Accordingly, even if the automatic exposure adjusting mode is set in operative state in the flash photographing mode, it is possible to define the film sensitivity information by the rotating operation of the film sensitivity changing ring 9. That is, in the present invention, it is not necessary to use means to switch or change the modes or the means to turn off the automatic exposure adjusting control.

Further, when the automatic exposure adjusting device EE is in operative state and the scene is bright, the iris pin 8 is moved in the direction remote from the photographing light axis and in the radial direction of the iris ring 7 against the action of the spring 8a. Accordingly, in this state, if the flash photographing mode is set by displacing the strobo 1 to the operative position, such a state may occur that the iris pin 8 is positioned apart from the cam surface 7d of the iris ring 7, depending upon the predetermined film sensitivity information. However, in this case, the flash light is normally unnecessary for photographing and the light from the strobo 1 does not contribute to the photographing, so that the photographing is carried out under the automatic exposure adjusting mode. Such photographing technique is used especially, for example, when a person with a bright background is photographed so that both the person and background are exposed suitably.

Accordingly, in the present invention, it is not necessary to turn off the automatic exposure adjusting mode on strobo photographing.

I claim:
1. In a camera:
an adjustable iris;
an automatic dimmer strobo selectively movable with respect to said camera between an ordinary photographing position and a flash photographing position;
an adjustable film sensitivity changing ring;
and means responsive to strobo position for transmitting film sensitivity information from said film sen- sitivity changing ring to said iris when said strobo is in either position, said means comprising:

means including an automatic exposure device responsive to the position of said film sensitivity changing ring to adjust said iris when said strobo is in said ordinary photographing position;

and mechanical means connected between said film sensitivity changing ring and said iris to mechanically adjust said iris when said strobo is in said flash photographing position to a predetermined position determined by the film sensitivity information.

2. A camera according to claim 1 wherein said means responsive to strobo position for transmitting film sensitivity information further includes:

a rotatable iris ring for adjusting said iris;

first means connected between said strobo and said iris ring and responsive to the position of said strobo for controlling movement of said iris ring;

and second means connected between said iris ring and said film sensitivity changing ring and responsive to the position of said film sensitivity changing ring for controlling movement of said iris ring.

3. A camera according to claim 2 wherein said means responsive to strobo position for transmitting film sensitivity information also includes:

operating means connected between said iris ring and said iris;

biasing means for biasing said iris ring to cause said operating means to effect adjustment of said iris when said strobo is in said flash photographing position;

and wherein said first means connected between said strobo and said iris ring control operation of said biasing means when said strobo is in said ordinary photographing position.

4. A camera according to claim 3 wherein said operating means includes a cam surface on said iris ring and a cam follower engaged with said cam surface and connected to said iris.

5. A camera according to claim 4 wherein said film sensitivity changing ring includes light-transmitting apertures therein and wherein said means including said automatic exposure device further includes a photoresponsive device for receiving light transmitted through said apertures and for effecting operation of said automatic exposure device in response thereto.

6. In a camera:

an adjustable iris;

an automatic dimmer strobo selectively movable with respect to said camera between an ordinary photographing position and a flash photographing position;

an adjustable film sensitivity changing ring;

and means responsive to strobo position for transmitting film sensitivity information from said film sensitivity changing ring to said iris when said strobo is in either position, said means comprising:

an automatic exposure device for adjusting said iris and a photoresponsive device for receiving light through apertures in said film sensitivity changing ring to operate said automatic exposure device to adjust said iris when said strobo is in said ordinary photographing position;

and means connected between said film sensitivity changing ring and said iris to mechanically adjust said iris when said strobo is in said flash photographing position.

7. A camera according to claim 6 wherein said means responsive to strobo position for transmitting film sensitivity information further includes a rotatable iris ring;

means responsive to iris ring position for adjusting said iris;

biasing means for biasing said iris ring to effect adjustment of said iris;

first means connected between said strobo and said iris ring and responsive to the position of said strobo for enabling rotational movement of said iris ring by said biasing means when said strobo is in said flash photographing position;

and second means connected between said iris ring and said film sensitivity changing ring and responsive to the position of said film sensitivity changing ring for controlling movement of said iris ring when said strobo is in said flash photographing position.

8. In a camera:

an adjustable iris;

an automatic dimmer strobo movable with respect to said camera between an ordinary photographing position and a flash photographing position;

a rotatable adjustable film sensitivity changing ring having apertures therein and a pin-engaging means thereon;

automatic exposure control means including an automatic exposure control device for operating said iris and a photoresponsive device for receiving light through said apertures and for operating said automatic exposure control device in response thereto;

a rotatably adjustable iris ring having a cam thereon and a pin;

biasing means tending to effect rotation of said iris ring;

a cam follower connected between said cam and said adjustable iris;

a lever connected between said strobo and said pin on said iris ring whereby strobo position controls movement of said iris ring;

and a pin member on said iris ring engageable with said pin-engaging means on said film sensitivity changing ring.

9. A camera being settable to either one of an ordinary photographing state and a flash photographing state and comprising:

an automatic dimmer strobo displaceable between an operative position and an inoperative position;

an adjustable iris;

an automatic exposure control device for adjusting said iris;

an adjustable film sensitivity changing ring which is angularly displaceable to an adjusted position and having apertures for allowing light to pass therethrough to said automatic exposure control device in an amount corresponding to the angular position of said film sensitivity changing ring;

an angularly displaceable iris ring for adjusting said iris;

means connected between said strobo and said iris ring;

means for effecting rotation of said iris ring whereby said iris ring is responsive to displacement of said strobo to said operative position;

and interengageable means on said iris ring and on said film sensitivity changing ring which abut when said strobo is displaced to said operative position whereby the angular position of said iris ring is responsive to and determined by the position of said film sensitivity changing ring for introducing film sensitivity information to said adjustable iris.

10. A camera according to claim 9 wherein said iris ring comprises a cam surface thereon and including an iris pin engageable with said cam surface for effecting adjustment of said iris in response to the angular position of said iris ring.

11. A camera according to claim 10 further including: a spring connected between said camera and said strobo for causing said strobo to tend to move to said operative position; a movable strobo holder lever on said camera; a holder lever engagement means on said strobo for releasable engagement by said strobo holder lever to act against the force of said spring to prevent said strobo from protruding from said camera body; and wherein said interengageable means on said rings comprises a pin on said iris ring for engagement with a projection on said film sensitivity changing ring whereby when said strobo is moved to said operative position said iris ring is enabled to rotate to a position wherein said pin on said iris ring engages said projection on said film sensitivity changing ring.

* * * * *